W. DICKENSON.
MACHINE FOR CUTTING OUT MICA BETWEEN SEGMENTS IN COMMUTATORS.
APPLICATION FILED MAY 11, 1910.
1,064,715.
Patented June 17, 1913.
3 SHEETS—SHEET 1.
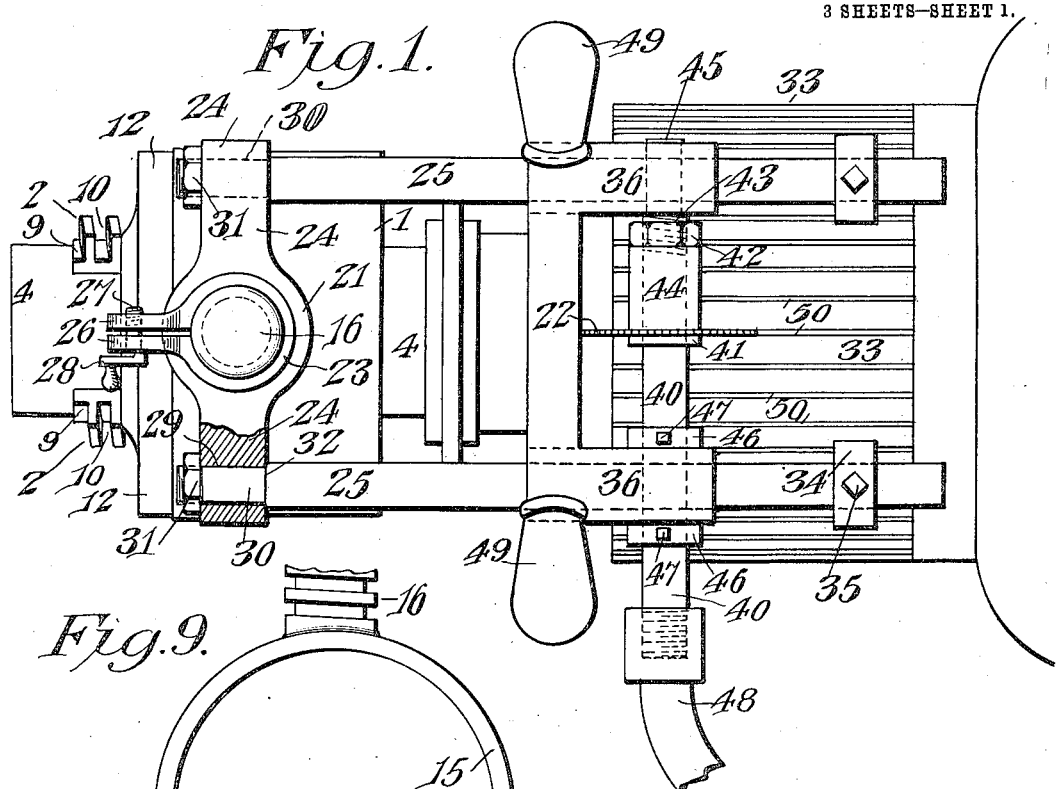
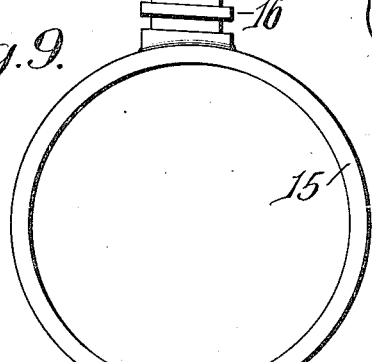
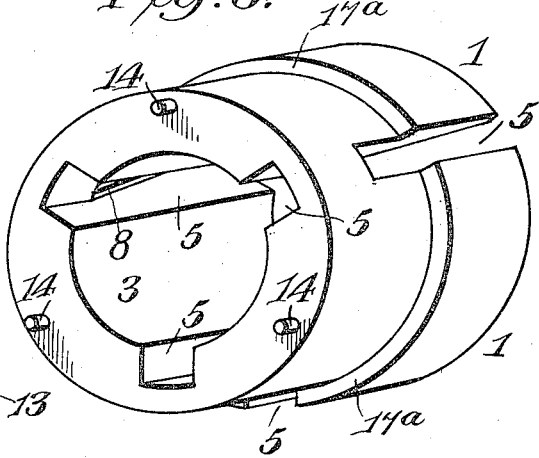
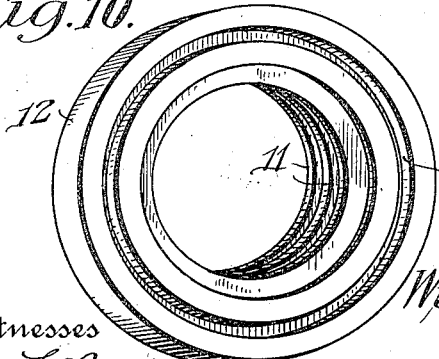
Witnesses
Jas. F. McLuthran
H. J. Riley
William Dickenson, Inventor
By E. G. Siggers
Attorney W. DICKENSON.
MACHINE FOR CUTTING OUT MICA BETWEEN SEGMENTS IN COMMUTATORS.
APPLICATION FILED MAY 11, 1910.
1,064,715.
Patented June 17, 1913.
3 SHEETS—SHEET 2.
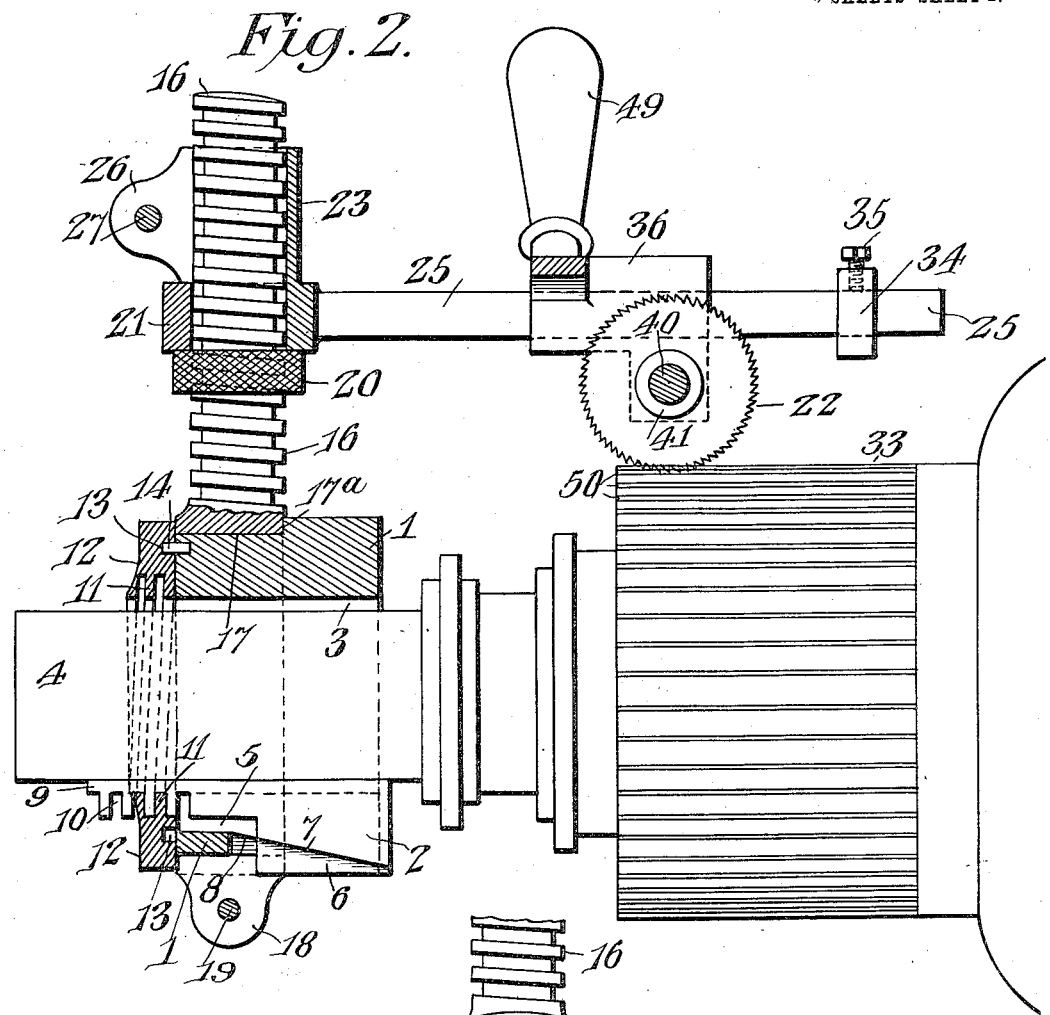
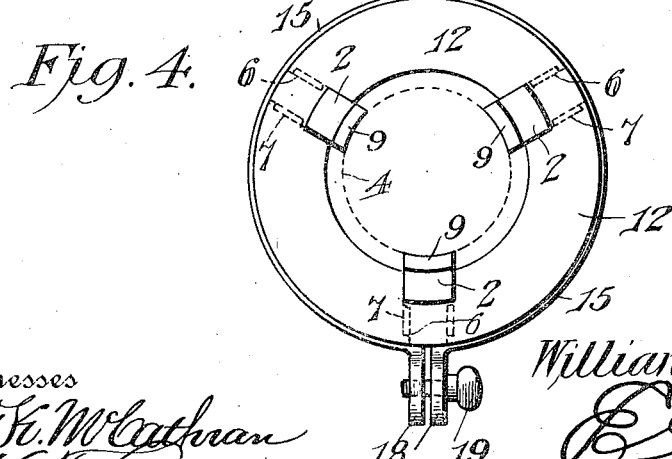
Witnesses
Inventor
William Dickenson,
Attorney

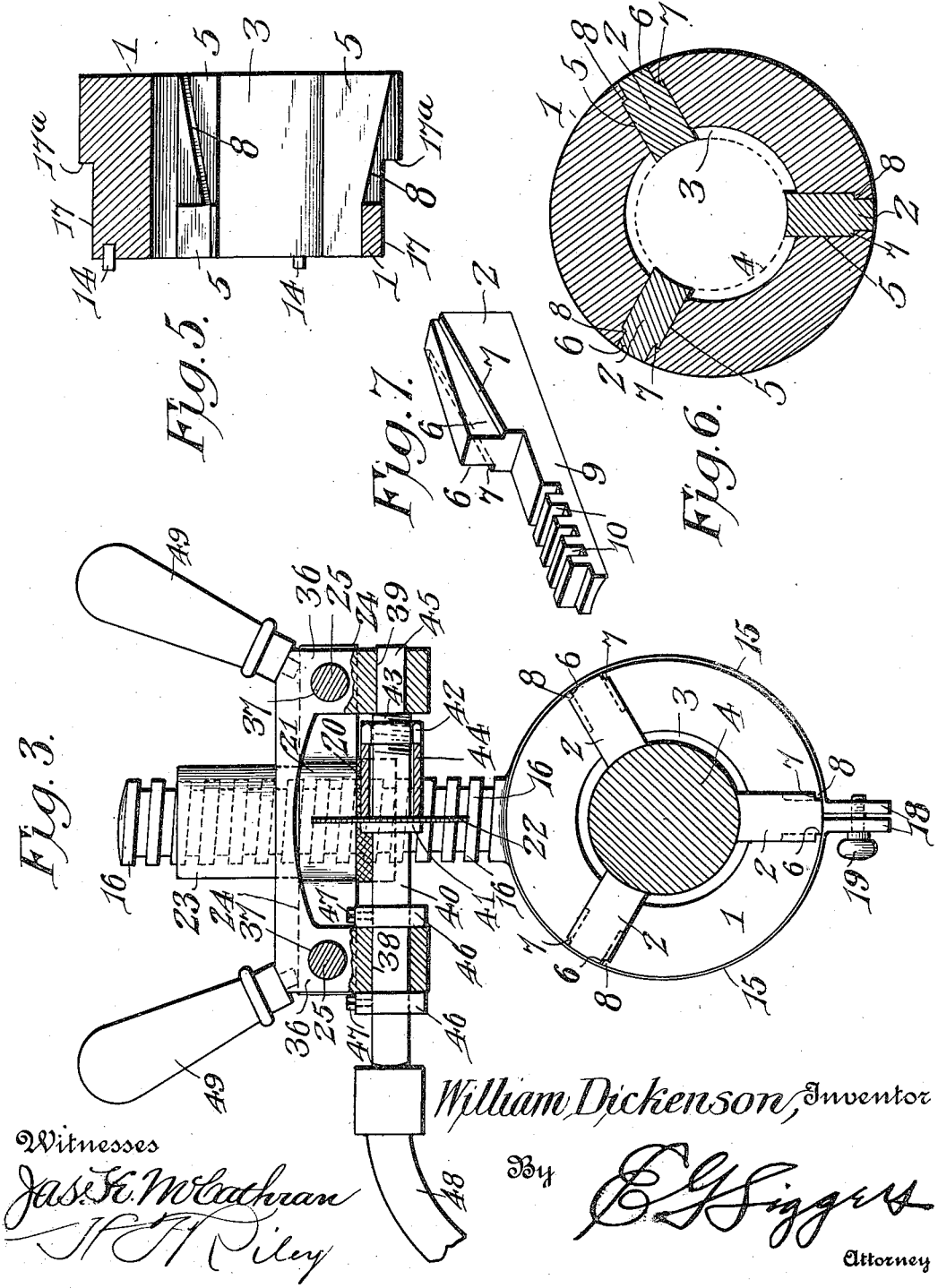

UNITED STATES PATENT OFFICE.

WILLIAM DICKENSON, OF NEW ORLEANS, LOUISIANA, ASSIGNOR, BY DIRECT AND MESNE ASSIGNMENTS, TO GENERAL ELECTRIC COMPANY, A CORPORATION OF NEW YORK.

MACHINE FOR CUTTING OUT MICA BETWEEN SEGMENTS IN COMMUTATORS.

1,064,715.      Specification of Letters Patent.    Patented June 17, 1913.

Application filed May 11, 1910. Serial No. 560,740.

*To all whom it may concern:*

Be it known that I, WILLIAM DICKENSON, a citizen of the United States, residing at New Orleans, in the parish of Orleans and State of Louisiana, have invented a new and useful Machine for Cutting Out Mica Between Segments in Commutators, of which the following is a specification.

The invention relates to improvements in machines for cutting out mica between segments in commutators.

Heretofore large bulky machines have been used for cutting out mica between the segments of a commutator, and it has been necessary to adjust the armature and commutator to successively present each sheet of mica to the cutter in order to be trimmed or cut out.

The object of the present invention is to provide a simple, inexpensive and efficient mica cutting or trimming machine, which will be light, easily handled, and capable of trimming the mica of a commutator in about ten minutes, a much less time than has heretofore been possible.

Another object of the invention is to provide a mica trimming machine of this character, adapted to be mounted directly on an armature shaft, and capable of adjustment to fit shafts of different diameters and of rotary movement thereon so as to operate on at least one quarter of the commutator before requiring any adjustment thereof.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Figure 1 is a plan view of a mica trimming or cutting machine, constructed in accordance with this invention and shown applied to an armature shaft in position for operating on a commutator. Fig. 2 is a central longitudinal sectional view of the machine. Fig. 3 is a transverse sectional view of the same. Fig. 4 is a detail view of the clamp and the rotary support. Fig. 5 is a vertical longitudinal sectional view of the clamp. Fig. 6 is a transverse sectional view of the same. Fig. 7 is a detail perspective view of one of the slidable clamping jaws. Fig. 8 is a detail perspective view of the sleeve or body of the clamp. Fig. 9 is a detail view of a portion of the rotary support. Fig. 10 is a detail perspective view of the adjusting nut for operating the slidable clamping jaws.

Like numerals of reference designate corresponding parts in all the figures of the drawings.

In the embodiment of the invention illustrated in the accompanying drawings, the machine for cutting out mica in commutators is equipped with a clamp, consisting of a circular body or sleeve 1 and a plurality of slidable clamping jaws 2. The circular body or sleeve has a central opening 3 to enable it to be placed on an armature shaft 4, and it is clamped thereon by means of the jaws 2. The jaws 2, which are movable longitudinally of the shaft, are arranged in horizontal slots or grooves 5 of the body or sleeve 1, and each is provided with a head recessed or reduced at opposite sides of the outer portion at 6 to form inclined or angularly disposed shoulders 7, which engage and co-act with inclined or angularly disposed walls 8 of the slots or grooves of the sleeve or body. The inclined or angularly disposed shoulders 7 form wedges, and when the slidable jaws 2 are moved outward, they are caused to frictionally engage and grip the armature shaft 4, whereby the circular body or sleeve of the clamp is securely held thereon. The slidable jaws 2 are provided with reduced outwardly extending shanks 9, having transverse grooves 10 which are engaged by threads 11 of an adjusting nut 12, adapted to be rotated for simultaneously moving the slidable wedge-shaped jaws inward or outward. The shanks or reduced portions 9 of the jaws extend beyond the outer end face of the body or sleeve 1, and the nut, which is fitted against the said outer or end face of the body or sleeve, is provided at its inner face with an annular groove 13 receiving a plurality of centering pins 14, which maintain the nut in a central position with relation to the opening 3 of the sleeve or body 1. The adjustment of the jaws enables the sleeve or body to be applied to any armature shaft of a diameter to enter the opening 3.

The circular body or sleeve forms a bearing for an adjustable support, capable of rotary movement around the sleeve or body and consisting of a ring or band 15 and a stem 16. The ring or band, which has a circular opening to fit a reduced bearing portion 17 of the sleeve 1, is provided with spaced outwardly extending ears 18, connected by a thumb screw 19, adapted to be adjusted to secure the desired frictional engagement between the support and the sleeve. When the parts are assembled, the ring or band is secured on the sleeve between the nut 12 and the shoulder 17ª, formed by reducing the sleeve to provide the bearing portion 17. The stem 16, which extends upwardly from the ring or band, is threaded for the reception of a nut 20, adapted to be raised or lowered to afford an adjustable support for a saw guiding frame 21. The nut 20 has a milled outer face, but any other suitable means may be provided for enabling it to be readily rotated to raise or lower the saw guiding frame. By raising and lowering the nut, the saw guiding frame may be adjusted to arrange a rotary cutter or saw 22 to suit the diameter of the commutator to be operated on.

The cutter or saw guiding frame 21 consists of a vertical sleeve 23, laterally extending arms 24 and spaced longitudinal guide rods 25. The sleeve 23 is split vertically and provided at opposite sides of the split portion with projecting ears or flanges 26, which are connected by a screw 27, equipped with a crank handle 28, or other means for adjusting it to clamp the sleeve on the stem to secure the guiding frame in proper relation to the arrangement of the sheets of mica to be trimmed or cut. The arms 24 are provided with openings 29 for the reception of the reduced front end portions 30 of the guide bars 25, which are threaded at their front terminals to receive nuts 31, which engage the arms 24. The reduction of the front end portions of the guide rods 25 form shoulders 32, and the arms 24 are clamped between the said shoulders and the nuts 31. The rotary movement of the support around the sleeve or body 1 permits the guiding frame to be arranged at any portion of the commutator 33, and to be shifted around the same as desired. The guide bars are equipped at their rear portions with adjustable collars 34, secured to the guide rods 25 by clamping screws 35 and forming stops for a slidable support or carriage 36. The slidable support or carriage, which is composed of spaced sides and a connecting transverse portion, formed integral with the sides, is connected with the same at the top thereof. The sides are provided with spaced longitudinal openings 37 for the reception of the guide rods 25, and they have lower transversely alined bearing openings 38 and 39 for the reception of a transverse shaft or arbor 40 on which the rotary saw 22 is mounted. The transverse shaft 40 is provided with a fixed collar 41, arranged centrally of the space between the sides of the slidable support or carriage, and forming an abutment for the saw 22, which is clamped against the collar 41 by a nut 42, mounted on a threaded portion 43 of the shaft, and engaging a short tubular member or sleeve 44, which is interposed between the nut and the saw. One end 45 of the transverse shaft 40 is slightly reduced beyond the threaded portion 43 and is arranged in the bearing opening 39. The other bearing opening receives the opposite end portion of the shaft, which is held against endwise movement by collars 46, located at the inner and outer faces of the adjacent side of the frame, and adjustably secured to the shaft 40 by clamping screws 47. The end of the shaft 40 is designed to be connected to a flexible shaft 48, or knuckle jointed shaft, or other suitable connection, which in practice will be driven by an electric, air, or any other kind of motor.

The slidable support or carriage 36 is equipped at opposite sides with upwardly extending handles or grips 49 diverging slightly in an upward direction and adapted to be readily grasped by the operator for sliding the carriage longitudinally of the guiding frame to engage the saw with the sheets of mica 50 of the commutator. After the guiding frame is adjusted in height to enable the machine to cut the desired depth and is arranged in parallelism with the upper edges of the sheets of mica, the carriage is adapted to be easily and conveniently operated for rapidly cutting or trimming the sheets of mica of the commutator. It has been found by practice that the sheets of mica of the commutator can be readily trimmed or cut in about ten minutes, and as the machine is supported upon the armature shaft, the operation may be performed while the armature is upon the floor or other supporting surface. The rotary adjustment of the support around the bearing of the clamp enables the machine to operate on the mica of at least one quarter of the commutator without adjusting the latter. After the sheets of mica of one quarter of the commutator have been cut or trimmed, the position of the commutator is changed to expose another section of it to the machine.

The saw or rotary cutter may be of any desired construction, and the rotary adjustable support, which carries the guiding frame, is spaced from the commutator a sufficient distance to permit the cutter to be drawn back beyond the commutator after a sheet of mica has been trimmed. This will enable the cutter to be readily engaged with another sheet by slightly rotating the support on the clamp a sufficient distance to carry the cutter from one sheet of mica to the next sheet.

The machine is designed for the cutting, slotting and grooving of mica on all classes of armatures that have a commutator, such as power house generators, dynamos, stationary motors, railroad armatures and the like.

Having thus fully described my invention, what I claim as new and desire to secure by Letters Patent, is:—

1. A machine for slotting commutators including a clamp provided with means for engaging an armature shaft, a support mounted on said clamp for rotary adjustment around the armature shaft, said clamp forming a bearing for said support, a guiding frame mounted on said support, and cutting mechanism movably mounted on said guiding frame.

2. A machine for slotting commutators including a guiding frame having a sleeve, a supporting means for the guiding frame having a stem and an armature shaft receiving opening, said supporting means being capable of rotary adjustment around the armature shaft, said sleeve being mounted on said stem, a slidable carriage mounted on the guiding frame and having spaced bearings, a shaft journaled in said bearings, a rotary cutter mounted on the shaft, and flexible shafting connected with said shaft for rotating the cutter.

3. A machine for slotting commutators including a clamp provided with means for engaging an armature shaft, a support mounted on said clamp for rotary adjustment around the armature shaft, said clamp forming a bearing for said support, a guiding frame mounted on said support having spaced guide rods, a carriage provided with spaced side portions having longitudinal openings to receive the guide rods and provided with a transversely alined bearing, a transverse shaft journaled in said bearing, a rotary cutter carried by the shaft, and stops mounted on the guide rods limiting the movement of the carriage.

4. A machine for slotting commutators including a support comprising a stem having an armature shaft receiving opening and capable of rotary adjustment around the armature shaft, a guiding frame comprising a sleeve arranged on the stem and provided with projecting arms, and guide bars extending from the arms, a carriage movable along the guide bars, and a cutting device mounted on the carriage.

5. A machine for slotting commutators including a support comprising a stem having an armature shaft receiving opening and capable of rotary adjustment around the armature shaft, a guiding frame comprising a sleeve arranged on the stem and provided with projecting arms, and guide bars extending from the arms, a carriage movable along the guide bars, a cutting device mounted on the carriage, and stops mounted on the guide rods and limiting the movement of the carriage.

6. A machine for slotting commutators including a support comprising a stem having an armature shaft receiving opening and capable of rotary adjustment around the armature shaft, a guiding frame comprising a sleeve arranged on the stem and provided with projecting arms, said guiding frame being adjustable inwardly and outwardly on said stem, and guide bars extending from the arms, a carriage movable along the guide bars, and a cutting device mounted on the carriage.

7. A machine for slotting commutators including a support comprising a stem having an armature shaft receiving opening and capable of rotary adjustment around the armature shaft, a guiding frame comprising a sleeve arranged on the stem and provided with projecting arms, said guiding frame being adjustable inwardly and outwardly on said stem, and guide bars extending from the arms, a carriage movable along the guide bars, a cutting device mounted on the carriage, and stops mounted on the guide rods and limiting the movement of the carriage.

8. A machine for slotting commutators including a support comprising a stem having an armature shaft receiving opening and capable of rotary adjustment around the armature shaft, a guiding frame comprising a sleeve arranged on the stem, said guiding frame being adjustable inwardly and outwardly on said stem, and a guide bar extending from said frame, a carriage movable along said guide bar, and a cutting device mounted on said carriage.

9. A machine for slotting commutators including a projecting support, means for mounting the support on an armature shaft for rotary adjustment around the same, a guiding frame carried by the support and extending therefrom in a direction parallel to the axis of the opening in said mounting means and arranged to project over and movable around the commutator, said guiding frame being adjustable inwardly and outwardly on the support to position it with respect to commutators of different diameters.

10. A machine of the class described including projecting supporting means, an armature shaft engaging clamp supporting the said means for rotary adjustment around the armature shaft, a guiding frame carried by the supporting means and extending therefrom in a direction parallel to the axis of said engaging clamp, so as to occupy a position over the commutator of the said shaft and movable inwardly and outwardly on the supporting means to accommodate commutators of different diameters, and reciprocatory cutting mechanism guided by the said frame and movable through the said rotary adjustment from one sheet of mica to another of said commutator.

11. A machine of the class described including a clamp composed of a sleeve having a reduced bearing portion and provided thereat with a shoulder, and a plurality of slidable clamping jaws operating within the sleeve for engaging a shaft, a support mounted on the bearing portion of the sleeve, cutting mechanism carried by the support, and a nut fitted against the sleeve and retaining the support on the bearing portion of the sleeve against the shoulder thereof and engaging the jaws for simultaneously operating the same.

12. A machine of the class described comprising a sleeve adapted to be arranged on an armature shaft and provided with a plurality of slots, a plurality of clamping jaws slidable in the slots and having wedge-shaped portions coöperating with the sleeve, said jaws being also provided with shanks having grooves, a nut engaging the grooves of the shanks for simultaneously operating the jaws, a support mounted on the clamp, and cutting mechanism carried by the support.

13. A machine of the class described including a sleeve provided with longitudinal slots having inclined walls, a plurality of slidable clamping jaws arranged in the slots of the sleeve and reduced at opposite sides to form inclined shoulders coöperating with the said walls to cause the jaws to engage a shaft, means for adjusting the jaws, a support mounted on the sleeve, and cutting mechanism carried by the support.

14. A machine of the class described including a sleeve provided with longitudinal slots having inclined walls, a plurality of slidable clamping jaws arranged in the slots of the sleeve and reduced at opposite sides to form inclined shoulders coöperating with the said walls to cause the jaws to engage a shaft, means for operating the jaws, said jaws being also provided with shanks having grooves, a nut fitted against the sleeve and engaging the grooves for simultaneously adjusting the jaws, a support mounted on the sleeve, and cutting mechanism carried by the support.

15. A machine of the class described including a sleeve adapted to be arranged on an armature shaft and provided with slots, clamping jaws operating in the slots to engage the shaft, a rotary nut interlocked with the jaws and adapted to simultaneously adjust the same, said nut being fitted against the sleeve and provided in its inner face with an annular groove, a plurality of projections extending from the sleeve and engaging the groove of the nut, a support mounted on the sleeve, and cutting mechanism carried by the support.

16. A machine of the class described including a clamp provided with means for engaging an armature shaft and having a bearing portion, a support provided with a stem and having means for mounting the same on the bearing portion of the sleeve for rotary adjustment around the armature shaft, a guiding frame mounted on the stem, adjustable means carried by the stem for supporting the guiding frame at different points along the said stem, and cutting mechanism movable along the guiding frame.

17. A machine of the class described including a radially arranged supporting stem, an armature shaft engaging clamp supporting the stem and capable of rotary adjustment around the armature shaft, a guiding frame carried by the stem and movable inwardly and outwardly on the same and extending from the stem in a direction parallel to the axis of said engaging clamp so as to project over and move around the commutator of the said shaft, an adjustable device mounted on the stem and forming a support for the guiding frame, and reciprocatory cutting mechanism guided by the said frame and arranged to trim the sheets of mica of the commutator and movable from one sheet of mica to another without removing the machine from the armature shaft.

18. A machine of the class described including a clamp provided with means for engaging an armature shaft and having a bearing portion, a support consisting of a stem provided with a split ring arranged on the bearing portion of the sleeve and having adjusting means, a guiding frame mounted on the stem, and cutting mechanism movable along the guiding frame.

19. A machine of the class described including a clamp provided with means for engaging an armature shaft, a stem mounted on the clamp for rotary adjustment around the armature shaft, a guiding frame adjustable along the stem, and cutting mechanism mounted on the guiding frame.

20. A machine of the class described including a clamp provided with means for engaging an armature shaft, a stem mounted on the clamp for rotary adjustment around the armature shaft and provided with threads, a nut engaging the threads, a guiding frame mounted on the stem and supported by the nut, and cutting mechanism movable along the guiding frame.

21. A machine of the class described including a clamp, a support consisting of a stem mounted for rotary adjustment around the clamp, a guiding frame comprising a sleeve arranged on the stem and provided with projecting arms, and guide bars extending from the arms, a carriage movable along the guide bars, and a cutting device mounted on the carriage.

22. A machine of the class described including a support consisting of a stem, means for mounting the stem on an armature shaft for rotary adjustment around the same, a guiding frame provided with a split sleeve arranged on the stem and having adjusting means for engaging the split sleeve with the stem, a carriage movable along the guiding frame, and a cutting device mounted on the carriage.

23. A machine of the class described including a support provided with a stem, means for mounting the support for rotary adjustment around an armature shaft, a guiding frame comprising a split sleeve arranged on the stem and having projecting ears, arms extending from the sleeve, and guide rods mounted on the arms, a carriage movable along the guide rods, a cutting device mounted on the carriage, and a screw having operating means and connecting the said ears of the split sleeve to cause the latter to engage the stem.

In testimony that I claim the foregoing as my own, I have hereto affixed my signature in the presence of two witnesses.

WILLIAM DICKENSON.

Witnesses:
J. C. HOLLINGSWORTH,
SAM'L WOLF.